US008054812B2

(12) United States Patent
Won

(10) Patent No.: US 8,054,812 B2
(45) Date of Patent: Nov. 8, 2011

(54) APPARATUS AND METHOD FOR TRANSMITTING DATA FRAME IN WLAN TERMINAL

(75) Inventor: Sang-Yeon Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1027 days.

(21) Appl. No.: 11/648,610

(22) Filed: Jan. 3, 2007

(65) Prior Publication Data

US 2007/0183443 A1 Aug. 9, 2007

(30) Foreign Application Priority Data

Feb. 8, 2006 (KR) ........................ 10-2006-0012282

(51) Int. Cl.
*H04Q 7/24* (2006.01)
(52) U.S. Cl. ...... 370/338; 370/335; 370/342; 455/422.1
(58) Field of Classification Search .................. 713/201; 709/224; 370/229, 338, 465, 310, 437, 329, 370/442, 335; 455/422.1
See application file for complete search history.

(56) References Cited

U.S. PATENT DOCUMENTS

| 7,187,665 | B2 * | 3/2007 | Nakamura ................. 370/329 |
| 7,224,679 | B2 * | 5/2007 | Solomon et al. ............ 370/338 |
| 2002/0071448 | A1 | 6/2002 | Cervello et al. |
| 2002/0120740 | A1 | 8/2002 | Ho et al. |
| 2003/0091066 | A1 | 5/2003 | Choi et al. |
| 2003/0133469 | A1 | 7/2003 | Brockmann et al. |
| 2003/0214905 | A1 * | 11/2003 | Solomon et al. ............ 370/229 |
| 2004/0013128 | A1 * | 1/2004 | Moreton et al. ............ 370/447 |
| 2004/0054774 | A1 * | 3/2004 | Barber et al. ............... 709/224 |
| 2004/0078598 | A1 * | 4/2004 | Barber et al. ............... 713/201 |
| 2005/0243860 | A1 * | 11/2005 | Chen et al. ................. 370/465 |
| 2005/0276276 | A1 * | 12/2005 | Davis ........................ 370/447 |
| 2006/0007935 | A1 * | 1/2006 | Bennett et al. ............. 370/395.5 |

FOREIGN PATENT DOCUMENTS

KR 10-2006-0104488 10/2006

OTHER PUBLICATIONS

UK Search Report corresponding to UK Patent Application No. 0700808.9, issued on May 1, 2007.
Korean Decision of Grant corresponding to Korean Patent Application No. 2006-0012282, issued on May 30, 2007.

* cited by examiner

*Primary Examiner* — Danh Le
(74) *Attorney, Agent, or Firm* — H.C. Park & Associates, PLC

(57) ABSTRACT

A system and method for transmitting data in a wireless local area network (WLAN) are provided. The data transmission system in the WLAN includes: an access point for periodically transmitting beacon frame information; and a wireless terminal for determining the number of data frames depending on a transmission rate of a current data frame, producing a setting frame containing duration information determined depending on the number of data frames, transmitting the setting frame, and then consecutively transmitting as many data frames as the determined number during a duration time when it is determined that a communication environment is an overlapping legacy BSS condition (OLBC) environment based on the beacon frame information received from the access point.

16 Claims, 6 Drawing Sheets

APPARATUS AND METHOD FOR TRANSMITTING DATA FRAME IN WLAN TERMINAL

CLAIM OF PRIORITY

This application makes reference to, incorporates the same herein, and claims all benefits accruing under 35 U.S.C. §119 from an application for DATA FRAME TRANSMISSION DEVICE AND METHOD IN WIRELESS LOCAL AREA NETWORK TERMINAL earlier filed in the Korean Intellectual Property Office on 8 Feb. 2006 and there duly assigned Serial No. 10-2006-0012282.

BACKGROUND OF THE INVENTION

1. Field of the Invention

The present invention relates to an apparatus and method for transmitting a data frame in a wireless local area network (WLAN) terminal, and more particularly, to an apparatus and method for transmitting a data frame in a WLAN terminal in which when a self-CTS (clear to send) or RTS/CTS (request to send/clear to send) frame which is a protection mode frame to prevent a collision of frames transmitted between IEEE 802.11b and IEEE 802.11g devices is transmitted, an overhead resulting from the self-CTS or RTS/CTS frame is reduced by increasing a frame duration value and then transmitting data frames of QHYR number, and the throughput of the 802.11g device is increased by determining the number of data frames to be transmitted depending on the current transmission rate while achieving fairness in wireless transmission.

2. Description of the Related Art

In general, IEEE 802.11 is a collection of standards for a wireless local area network (WLAN) developed by an IEEE working group and currently includes IEEE 802.11, IEEE 802.11a, IEEE 802.11b, and IEEE 802.11g. The four standards use a carrier sense multiple access/collision avoidance (CSMA/CA) protocol which is an Ethernet protocol to share a path. IEEE 802.11b provides a transmission rate of about 11 Mbps per second, whereas IEEE 802.11g, which is most currently approved, provides a transmission rate of maximum 54 Mbps in a relatively short distance. Since IEEE 802.11g operates at a band of 2.4 GHz like 802.11b, there is compatibility between the two standards.

An 802.11g protection mode is provided to protect a data frame transmitted between 802.11g equipment and 802.11b equipment which are compatible with each other. The 802.11g protection mode is classified into a request to send (RTS) method, a clear to send (CTS) method and a self-CTS method.

When an 802.11g wireless terminal transmits a data frame modulated by an orthogonal frequency division multiplexing (OFDM), the 802.11b equipment may not detect it and determine that a channel is not busy, and thus it may attempt to transmit a frame, thereby resulting in a collision with a data frame transmitted from the 802.11g wireless terminal. The 802.11g protection mode is used to protect a data frame from a possible collision. As the 802.11g protection mode, the RTS method, the CTS method, or the self-CTS method is usually used.

In the 802.11g protection mode, an RTS/CTS or self-CTS frame is modulated to be recognized by the 802.11b equipment and then transmitted before an actual data frame is transmitted, thereby protecting the 802.11g frame. At this time, the RTS/CTS or self-CTS frame has information about a time required to transmit the 802.11g frame and to receive an ACK (acknowledgment) frame which is recorded in its duration field.

The wireless equipment that receives the RTS/CTS or self-CTS frame does not transmit data during the time recorded in the duration field, and, thus, a wireless channel is guaranteed between the wireless equipment that transmits and receives data.

However, the following problems occur as the RTS/CTS or self-CTS frame is modulated to be recognized by the 802.11b wireless equipment and then transmitted before the 802.11g frame is transmitted as described above.

First, the RTS/CTS or self-CTS frame should be transmitted to prevent a collision of packets, and thus an overhead occurs which leads to reduction of a transmission rate (i.e., throughput).

In addition, when the 802.11g wireless terminal competes with the 802.11b wireless terminal, since a link speed of the 802.11g wireless terminal is higher than that of the 802.11b wireless terminal, the 802.11g wireless terminal occupies a channel during a relatively short time and thus undergoes relatively big reduction in transmission rate.

SUMMARY OF THE INVENTION

It is an objective of the present invention to provide an apparatus and method for transmitting a data frame in a WLAN terminal in which transmission fairness is guaranteed between an 802.11b terminal and an 802.11g terminal by reducing degradation of a transmission rate through compensation of a channel occupying time of the 802.11g terminal, thereby solving the problem that the throughput is reduced due to overhead resulting from the self-CTS or RTS/CTS frame.

An exemplary embodiment of the present invention to provides an apparatus and method for transmitting a data frame in a WLAN terminal in which the transmission rate of the 802.11g terminal is increased while achieving fairness in wireless transmission by increasing a time recorded in the duration field of the self-CTS or RTS/CTS frame to transmit a plurality of data frame to thereby reduce the overhead resulting from the self-CTS or RTS/CTS frame and by determining the number of data frames to be transmitted depending on a current transmission rate not to thereby let the channel be occupied for a time more than necessary.

A first aspect of the present invention provides a data transmission system in a WLAN, comprising: an access point for periodically transmitting beacon frame information; and a wireless terminal for determining the number of data frames depending on a transmission rate of a current data frame, producing a setting frame containing duration information determined depending on the number of data frames, transmitting the setting frame, and then consecutively transmitting as many data frames as the determined number during a duration time when it is determined that a communication environment is an overlapping legacy BSS (basic service set) condition (OLBC) environment based on the beacon frame information received from the access point.

The wireless terminal may comprise a protection mode operation decider for deciding whether a communication environment is an OLBC environment including an 802.11b wireless terminal and an 802.11g wireless terminal to determine whether to operate in an 802.11g protection mode; a transmission rate determiner for determining the transmission rate of the current frame when the 802.11g protection mode is set; a frame number determiner for determining the number of data frames to be transmitted per one setting frame depending on the determined transmission rate, the number of data frames being equal to at least one; a CTS duration value determiner for determining a duration field value of the setting frame according to the determined number of data frames; and a frame transceiver for transmitting the setting frame and then consecutively transmitting as many data frames as the determined number according to the determined duration field value.

The protection mode operation decider may decide that a communication environment is the OLBC environment when a protection bit is set in an ERP (extended rate PHY (physical layer)) field of a beacon frame received from the access point and uses a self-CTS or RTS/CTS.

The transmission rate determiner may determine the transmission rate of the current frame by checking the number of failed consecutive ACKs (acknowledgments), the number of succeeded ACKs, a timer time, and a signal strength value in a state that the 802.11g protection mode is set.

A second aspect of the present invention provides a data transmission system in a WLAN, comprising: an access point for periodically transmitting beacon frame information; and a wireless terminal for producing a setting frame containing transmission time information depending on a transmission rate of a current data frame, transmitting the setting frame and then consecutively transmitting at least one data frame during the transmission when it is determined that a communication environment is an overlapping legacy BSS condition (OLBC) environment based on the beacon frame information received from the access point.

The wireless terminal may comprise a protection mode operation decider for deciding whether a communication environment is an OLBC environment including an 802.11b wireless terminal and an 802.11g wireless terminal to determine whether to operate in an 802.11g protection mode; a transmission rate determiner for determining the transmission rate of the current frame when the 802.11g protection mode is set; a duration value determiner for allocating a transmission time of a data frame depending on the determined transmission rate and determining the allocated time as a duration field value of the setting frame; and a frame transceiver for transmitting the setting frame and then consecutively transmitting at least one data frame according to the determined duration field value.

The protection mode operation decider may decide that a communication environment is the OLBC environment when a protection bit is set in an ERP field of a beacon frame received from the access point and uses a self-CTS or RTS/CTS.

The transmission rate determiner may determine the transmission rate of the current frame by checking the number of failed consecutive ACKs, the number of succeeded ACKs, a timer time, and a signal strength value in a state that the 802.11g protection mode is set.

A third aspect of the present invention provides a data transmission method in a WLAN, comprising the steps of: periodically transmitting beacon frame information; and determining the number of data frames depending on a transmission rate of a current data frame, producing a setting frame containing duration information determined depending on the number of data frames, transmitting the setting frame, and then consecutively transmitting as many data frames as the determined number during a duration time when it is determined that a communication environment is an overlapping legacy BSS condition (OLBC) environment based on the transmitted beacon frame information.

The step of consecutively transmitting the data frame may comprise the steps of: deciding whether a communication environment is an OLBC environment including an 802.11b wireless terminal and an 802.11g wireless terminal to determine whether to operate in an 802.11g protection mode; determining the transmission rate of the current frame when the 802.11g protection mode is set; determining the number of data frames to be transmitted per one setting frame depending on the determined transmission rate, the number of data frames being equal to at least one; determining a duration field value of the setting frame according to the determined number of data frames; transmitting the setting frame, and then consecutively transmitting as many data frames as the determined number according to the determined duration field value.

In the step of deciding whether a communication environment is an OLBC environment including an 802.11b wireless terminal and an 802.11g wireless terminal to determine whether to operate in an 802.11g protection mode, it may be determined that a communication environment is an OLBC environment when a protection bit is set in an ERP field of a beacon frame received from the access point, and a self-CTS or RTS/CTS is used.

The transmission rate of the current frame may be determined by checking the number of failed consecutive ACKs, the number of succeeded ACKs, a timer time, and a signal strength value in a state that the 802.11g protection mode is set.

A fourth aspect of the present invention provides a data transmission method in a WLAN, comprising the steps of: periodically transmitting beacon frame information; and producing a setting frame containing transmission time information depending on a transmission rate of a current data frame, transmitting the setting frame and then consecutively transmitting at least one data frame during the transmission when it is determined that a communication environment is an overlapping legacy BSS condition (OLBC) environment based on the transmitted beacon frame information.

The step of consecutively transmitting the data frame may comprise the steps of: deciding whether a communication environment is an OLBC environment including an 802.11b wireless terminal and an 802.11g wireless terminal to determine whether to operate in an 802.11g protection mode; determining the transmission rate of the current frame when the 802.11g protection mode is set; allocating a transmission time of a data frame depending on the determined transmission rate and determining the allocated time as a duration field value of the setting frame; and transmitting the setting frame and then consecutively transmitting at least one data frame according to the determined duration field value.

In the step of deciding whether a communication environment is an OLBC environment including an 802.11b wireless terminal and an 802.11g wireless terminal to determine whether to operate in an 802.11g protection mode, it may be determined that a communication environment is an OLBC environment when a protection bit is set in an ERP field of a beacon frame received from the access point, and a self-CTS or RTS/CTS is used.

The transmission rate of the current frame may be determined by checking the number of failed consecutive ACKs, the number of succeeded ACKs, a timer time, and a signal strength value in a state that the 802.11g protection mode is set.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Hereinafter, exemplary embodiments of the present invention will be described in detail with reference to the accompanying drawings. In the following description, a detailed description of known functions and configurations incorporated herein has been omitted for conciseness.

Figure 1:
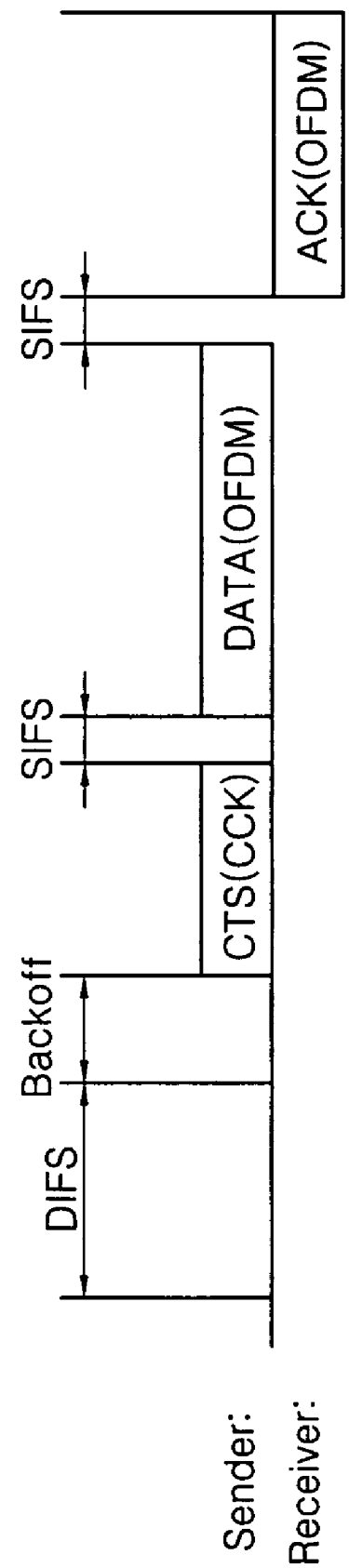
FIG. 1 is a diagram illustrating a typical data transmission method in an 802.11g protection mode of a WLAN.

FIG. 1 is a diagram illustrating a typical data transmission method in the 802.11g protection mode of the WLAN.

As shown in FIG. 1, when an 802.11g wireless terminal transmits a 802.11g frame in the 802.11g protection mode of the WLAN, overhead such as a distributed interframe space (DIFS) (28 to 50 μsec), a backoff time (about 15/2×9 to 31/2×20 μsec), a CTS (clear to send) transmission time, and a short interframe space (SIFS) (10 μsec) occurs, and thus the 802.11g wireless terminal has a much lower transmission rate (i.e., throughput) compared to an 802.11b wireless terminal.

The 802.11g wireless terminal has a shorter channel occupation time than the 802.11b wireless terminal. This causes the 802.11g wireless terminal to sustain a loss in a wireless environment where the 802.11b wireless terminal and the 802.11g wireless terminal are used together.

For example, in the case where a data frame of 1,500 bytes are transmitted, the 802.11b wireless terminal (11 Mbps) occupies a corresponding channel during a time period of about 1090.9 μsec (1500 (bytes)×8/11 (Mbps)=1090.9 μsec)), whereas the 802.11g wireless terminal (54 Mbps) occupies a corresponding channel during a time period of about 222.2 μsec (1500 (bytes)×8/54=222.2 μsec).

Figure 2:
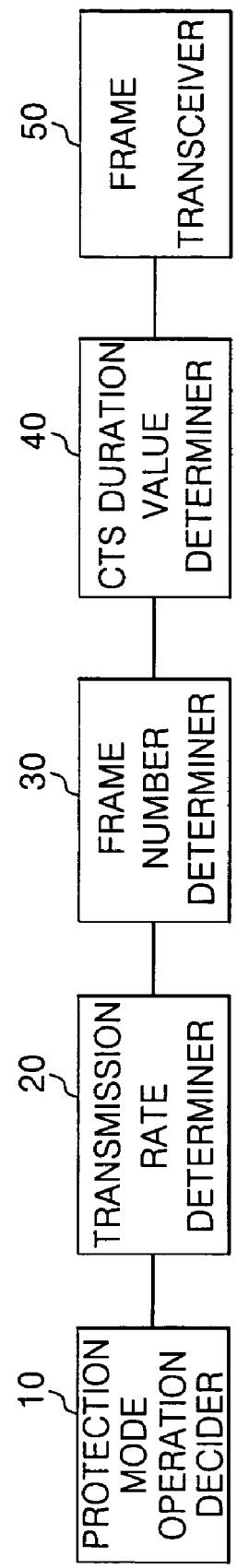
FIG. 2 is a diagram illustrating the configuration of a WLAN terminal according to an exemplary embodiment of the present invention.
Figure 3:
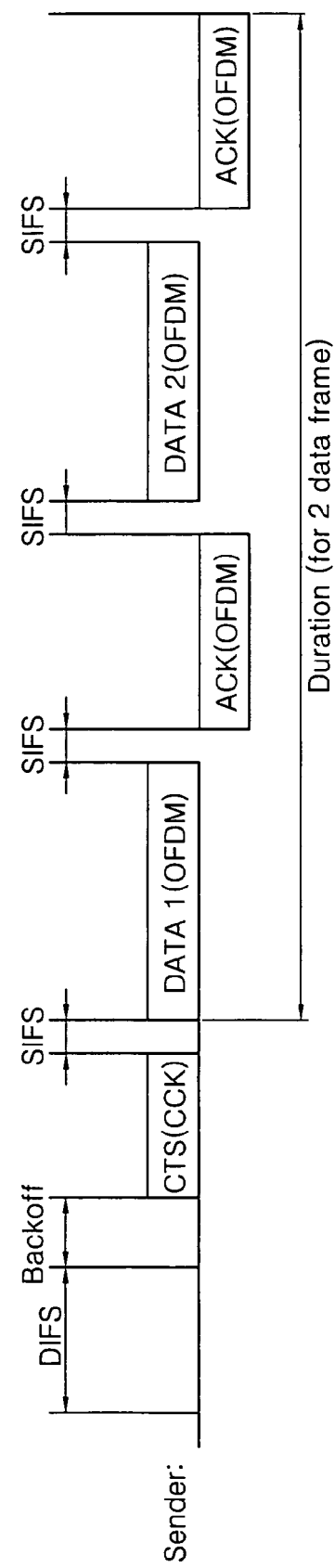
FIG. 3 is a diagram illustrating a data frame transmission method according to an exemplary embodiment of the present invention.
Figure 4:
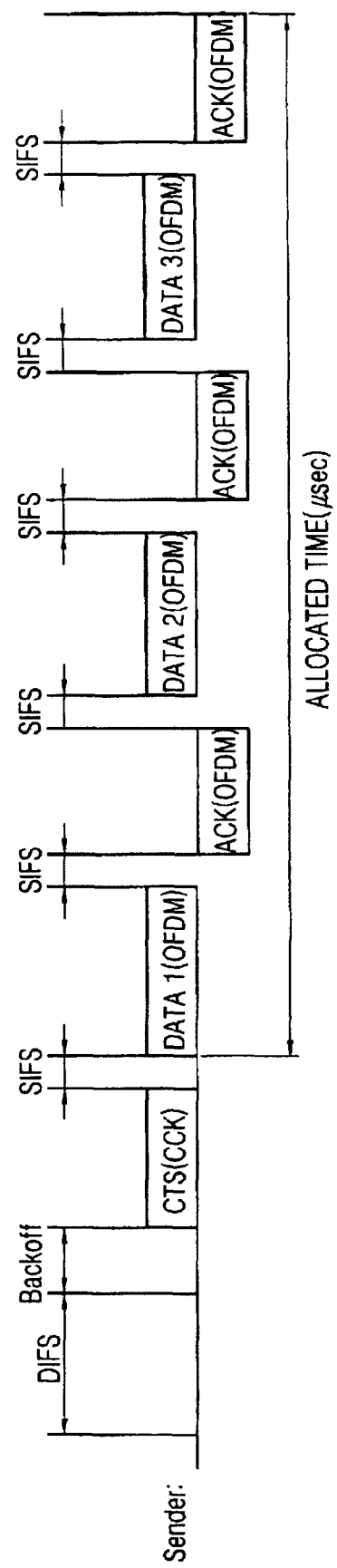
FIG. 4 is a diagram illustrating a data frame transmission method according to another exemplary embodiment of the present invention.

FIG. 2 is a diagram illustrating the configuration of a WLAN terminal according to an exemplary embodiment of the present invention. FIG. 3 is a diagram illustrating a data frame transmission method according to the exemplary embodiment of the present invention. FIG. 4 is a diagram illustrating a data frame transmission method according to another exemplary embodiment of the present invention.

As shown in FIG. 2, the WLAN terminal of the present invention comprises a protection mode operation decider 10, a transmission rate determiner 20, a frame number determiner 30, a CTS duration value determiner 40, and a frame transceiver 50.

The protection mode operation decider 10 decides whether a communication environment is an OLBC environment including an 802.11b wireless terminal and an 802.11g wireless terminal to determine whether to operate in an 802.11g protection mode For example, an 802.11g WLAN access point (AP) determines whether an overlapping legacy BSS condition (OLBC) is met, and then sets "Use_Protection (b1)" to "1" when the OLBC happens and the existing 802.11b legacy BSS is detected.

This detection is performed by receiving a beacon in which an extended rate PRY (ERP) information element (IE) is "NonERP_Present(b0)=1" from a nonERP BSS which does not support the ERP. Use_Protection is set to "1" when there is the OLBC, and a NonEPR_Present bit is not set to "1" when the 802.11b station (STA) is not associated with the access point (AP) itself.

An IEEE 802.11g WLAN client determines that a communication environment is the OLBC environment when a bit is set in the ERP field of the beacon received from the AP associated with itself and thus uses the self-CTS or RTS/CTS.

The transmission rate determiner 20 determines or checks a transmission rate of a current frame. The number of failed consecutive ACKs (acknowledgments), the number of succeeded ACKs, and a timer time can be adjusted, and signal strength may be used as a parameter for determining the transmission rate as well.

The frame number determiner 30 determines the number of data frames to be transmitted per a single self-CTS (or RTS/CTS) frame depending on the determined transmission rate.

The CTS duration value determiner 40 determines a duration field value depending on the determined number of the data frames.

The frame transceiver 50 first transmits the self-CTS (or RTS/CTS) frame and then transmits the data frames consecutively depending on the number of the data frames and the duration field value.

The frame number determiner 30 determines the number of the data frames to be consecutively transmitted depending on the transmission rate determined by the transmission rate determiner 20 as shown in Table 1 below.

The CTS duration value determiner 40 determines the CTS duration field value depending on the number of frames determined by the frame number determiner 30 as shown in Table 1.

Table 1 exemplarily shows the number of frames having the size of maximum 1,500 bytes depending on the transmission rate determined by the transmission rate determiner 20.

TABLE 1

| Transmission Rate | Number of Frames to be Consecutively Transmitted | CTS Duration Value |
| --- | --- | --- |
| 54 Mbps | 3 | 1020 μsec |
| 48 Mbps | 3 | 1140 μsec |
| 36 Mbps | 2 | 920 μsec |
| 24 Mbps | 2 | 1260 μsec |
| 18 Mbps | 1 | depending on frame size |

As can be seen in Table 1, when a transmission rate is 54 Mbps, 3 frames are consecutively transmitted, and a CTS duration field value is set to 1020 μsec.

When a transmission rate is 48 Mbps, 3 frames are consecutively transmitted, and a CTS duration field value is set to 1140 μsec.

When a transmission rate is 36 Mbps, 2 frames are consecutively transmitted, and a CTS duration field value is set to 920 μsec.

When a transmission rate is 24 Mbps, 2 frames are consecutively transmitted, and a CTS duration field value is set to 1260 μsec.

When a transmission rate is 18 Mbps, 1 frame is transmitted, and a CTS duration field value depends on the frame size.

For example, when a transmission rate is 36 Mbps, the CTS frame is transmitted and then 2 frames of DATA1 and DATA2 are consecutively transmitted as shown in FIG. 3. Here, since the CTS duration field value is set to 920 μsec, 2 data frames (DATA1 and DATA2) can be consecutively transmitted during 920 μsec.

The CTS duration value determiner 40 determines a total allocated time for data transmission depending on the determined transmission rate as shown in Table 2, and sets the allocated time dependent on the transmission rate as the CTS duration value.

Thus, packets can be consecutively transmitted to the same destination during the allocated time.

Table 2 shows the allocated time depending on the transmission rate determined by the transmission rate determiner 20.

TABLE 2

| | Transmission rate | | | | | |
|---|---|---|---|---|---|---|
| | 54 Mbps | 48 Mbps | 36 Mbps | 24 Mbps | 18 Mbps | 12 Mbps |
| Allocated time | 1,000 μsec | 1,100 μsec | 1,000 μsec | 1,200 μsec | 800 μsec | 1,200 μsec |

As shown in Table 2, when a transmission rate determined by the transmission rate determiner 20 is 54 Mbps, a time of 1,000 μsec is allocated.

When a transmission rate determined by the transmission rate determiner 20 is 48 Mbps, a time of 1,100 μsec is allocated.

When a transmission rate determined by the transmission rate determiner 20 is 36 Mbps, a time of 1,000 μsec is allocated.

When a transmission rate determined by the transmission rate determiner 20 is 24 Mbps, a time of 1,200 μsec is allocated.

When a transmission rate determined by the transmission rate determiner 20 is 18 Mbps, a time of 800 μsec is allocated.

When a transmission rate determined by the transmission rate determiner 20 is 12 Mbps, a time of 1,200 μsec is allocated.

For example, when a transmission rate is 36 Mbps, the CTS frame is transmitted and then 3 frames of DATA1 to DATA3 are consecutively transmitted during a time of 1,000 μsec, as shown in FIG. 4. Here, since the CTS duration field value is set to 1,000 μsec, 3 frames data can be consecutively transmitted during 1,000 μsec.

Figure 5:
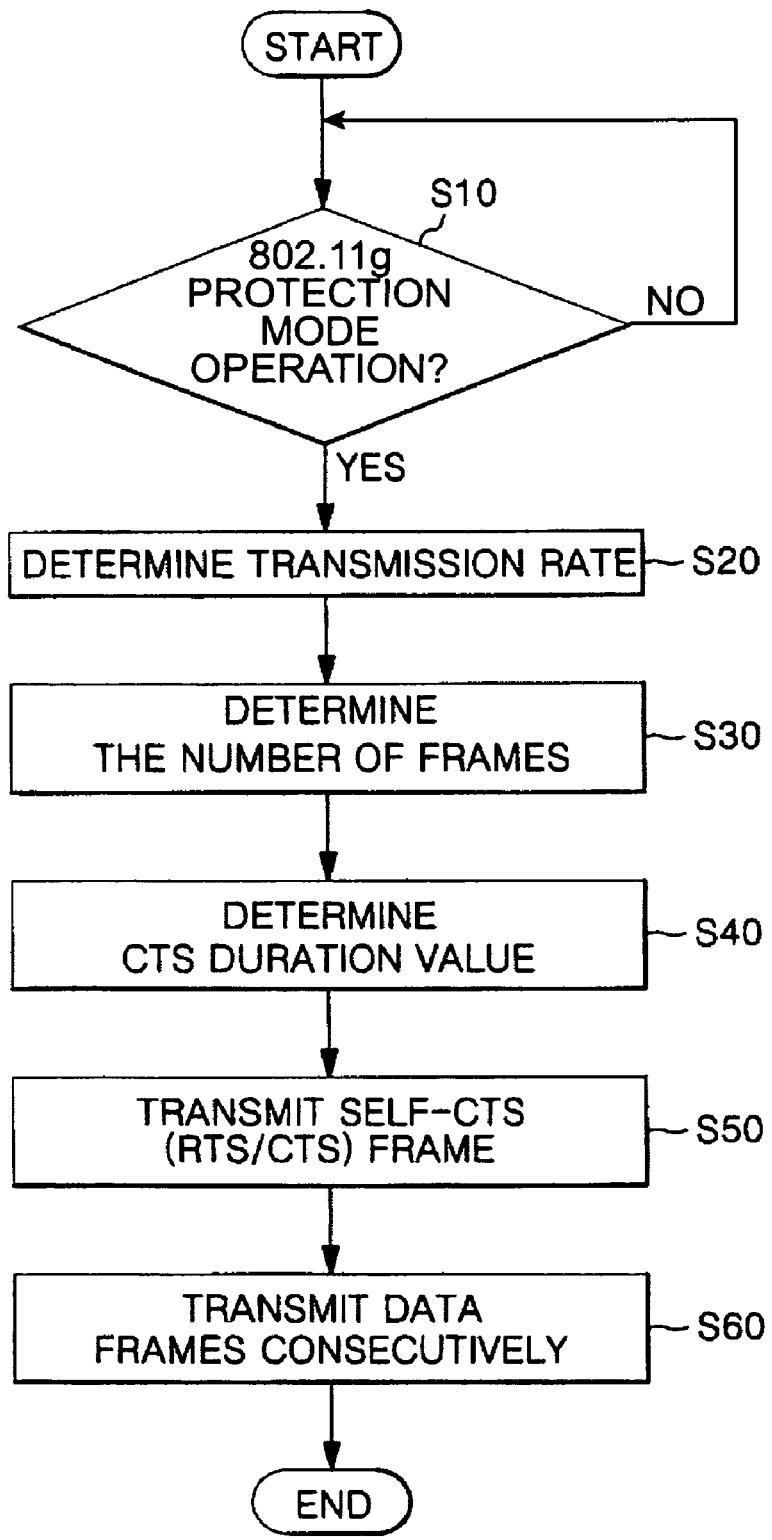
FIG. 5 is a flowchart illustrating a method for transmitting a data frame in the WLAN terminal according to an exemplary embodiment of the present invention.

FIG. 5 is a flowchart illustrating a method for transmitting a data frame in the WLAN terminal according to an exemplary embodiment of the present invention.

As shown in FIG. 5, the WLAN terminal checks whether a communication environment is an OLBC (overlapping legacy BSS (basic service set) condition) environment including an 802.11b wireless terminal and an 802.11g wireless terminal to determine whether to operate in an 802.11g protection mode (S10).

That is, an 802.11g WLAN access point (AP) determines whether an overlapping legacy BSS condition (OLBC) is met, and then sets "Use_Protection (b1)" to "1" when the OLBC happens and the existing 802.11b legacy BSS (basic service set) is detected.

This detection is performed by receiving a beacon in which an extended rate PHY (ERP) information element (IE) is "NonERP_Present(b0)=1" from a nonERP BSS which does not support the ERP. Use_Protection is set to "1" when there is the OLBC, and a NonEPR_Present bit is not set to "1" when the 802.11b station (STA) is not associated with the access point (AP) itself.

An IEEE 802.11g WLAN client determines that a communication environment is the OLBC environment when a bit is set in the ERP field of the beacon received from the AP associated with itself and thus uses the self-CTS or RTS/CTS.

If it is determined that the 802.11g protection mode should be performed, a transmission rate of a current data frame is determined (S20). The number of failed consecutive ACKs, the number of succeeded ACKs, and a timer time can be adjusted, and signal strength may be used as a parameter for determining the transmission rate as well.

The number of data frames to be transmitted per a single self-CTS (or RTS/CTS) frame is determined depending on the determined transmission rate (S30).

A duration field value to be recorded in the self-CTS (or RTS/CTS) frame is determined depending on the determined number of the data frames (S40).

The self-CTS (or RTS/CTS) frame is first transmitted (S50), and the data frames are then consecutively transmitted (S60) depending on the number of the data frames and the duration field value.

Figure 6:
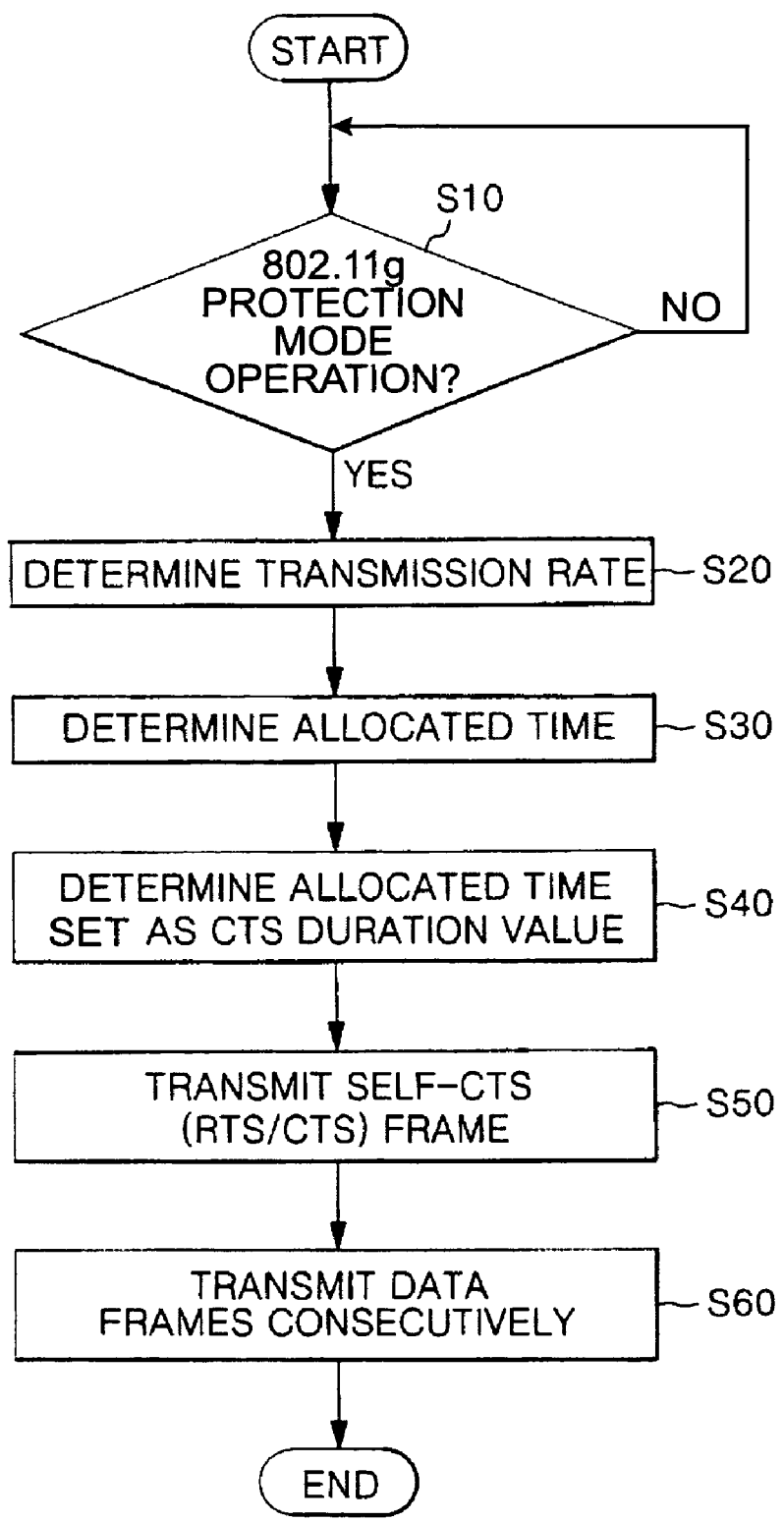
FIG. 6 is a flowchart illustrating a method for transmitting a data frame in the WLAN terminal according to another exemplary embodiment of the present invention.

FIG. 6 is a flowchart illustrating a method for transmitting a data frame in a WLAN terminal according to another exemplary embodiment of the present invention.

As shown in FIG. 6, the WLAN terminal checks whether a communication environment is an OLBC environment including an 802.11b wireless terminal and an 802.11g wireless terminal to determine whether to operate in an 802.11g protection mode (S10).

That is, an 802.11g WLAN access point (AP) determines whether an overlapping legacy BSS condition (OLBC) is met, and then sets "Use_Protection (b1)" to "1" when the OLBC happens and the existing 802.11b legacy BSS is detected.

This detection is performed by receiving a beacon in which an extended rate PHY (ERP) information element (IE) is "NonERP_Present(b0)=1" from a nonERP BSS which does not support the ERP. Use_Protection is set to "1" when there is the OLBC, and a NonEPR_Present bit is not set to "1" when the 802.11b station (STA) is not associated with the access point (AP) itself.

An IEEE 802.11g WLAN client determines that a communication environment is the OLBC environment when a bit is set in the ERP field of the beacon received from the AP associated with itself and thus uses the self-CTS or RTS/CTS.

If it is determined that the 802.11g protection mode should be performed, a transmission rate of a current frame is determined (S20). The number of failed consecutive ACKs (acknowledgments), the number of succeeded ACKs, and a timer time can be adjusted, and signal strength may be used as a parameter for determining the transmission rate as well.

A total allocated time for a data transmission is determined depending on the determined transmission rate (S30).

The allocated time determined depending on the transmission rate is set as the duration value of the self-CTS (RTS/CTS) frame (S40).

The self-CTS (or RTS/CTS) frame is first transmitted depending on the determined duration value of self-CTS (or RTS/CTS) frame (S50), and the data frames are then consecutively transmitted to the destination (S60).

As described above, according to the exemplary embodiments of the present invention, a plurality of data frames are transmitted per a single self-CTS (RTS/CTS) frame, and thus a relatively shorter channel occupation time compared to the 802.11b terminal can be compensated, and the overhead resulting from the self-CTS (RTS/CTS) frame can be reduced, thereby increasing the throughput of the 802.11g terminal in the 802.11g protection mode.

While the present invention has been described with reference to exemplary embodiments thereof, it will be understood by those skilled in the art that various changes in from and detail may be made therein without departing from the scope of the present invention as defined by the following claims.

What is claimed is:

1. A data transmission system in a Wireless Local Area Network (WLAN), comprising:
   an access point for periodically transmitting beacon frame information; and
   a wireless terminal for determining the number of data frames to be transmitted depending on a transmission rate of a current data frame, producing a setting frame containing duration information determined depending on the number of data frames to be transmitted, transmitting the setting frame, and then consecutively transmitting as many data frames as the determined number during a duration time when it is determined that a communication environment is an OLBC (overlapping legacy BSS (basic service set) condition) environment based on the beacon frame information received from the access point.

2. The system of claim 1, wherein the wireless terminal comprises:
   a protection mode operation decider for deciding whether a communication environment is the OLBC environment comprising an 802.11b wireless terminal and an 802.11g wireless terminal to determine whether to operate in an 802.11g protection mode;
   a transmission rate determiner for determining the transmission rate of the current frame when the 802.11g protection mode is set;
   a frame number determiner for determining the number of data frames to be transmitted per one setting frame depending on the determined transmission rate, the number of data frames to be transmitted being equal to at least one;
   a CTS (clear to send) duration value determiner for determining a duration field value of the setting frame according to the determined number of data frames to be transmitted; and
   a frame transceiver for transmitting the setting frame and then consecutively transmitting as many data frames as the determined number according to the determined duration field value.

3. The system of claim 2, wherein the protection mode operation decider decides that a communication environment is the OLBC environment when a protection bit is set in an ERP (extended rate PHY (physical layer)) field of the beacon frame received from the access point, and uses a self-CTS (clear to send) or RTS/CTS (request to send/clear to send).

4. The system of claim 2, wherein the transmission rate determiner determines the transmission rate of the current frame by checking the number of failed consecutive ACKs (acknowledgments), the number of succeeded ACKs (acknowledgments), a timer time, and a signal strength value in a state that the 802.11g protection mode is set.

5. A data transmission system in a Wireless Local Area Network (WLAN), comprising:
   an access point for periodically transmitting beacon frame information; and
   a wireless terminal for producing a setting frame containing transmission time information depending on a transmission rate of a current data frame, transmitting the setting frame, and then consecutively transmitting at least one data frame during the transmission when it is determined that a communication environment is an OLBC (overlapping legacy BSS (basic service set) condition) environment based on the beacon frame information received from the access point.

6. The system of claim 5, wherein the wireless terminal comprises:
   a protection mode operation decider for deciding whether a communication environment is the OLBC environment comprising an 802.11b wireless terminal and an 802.11g wireless terminal to determine whether to operate in an 802.11g protection mode;
   a transmission rate determiner for determining the transmission rate of the current frame when the 802.11g protection mode is set;
   a duration value determiner for allocating a transmission time of a data frame depending on the determined transmission rate and determining the allocated time as a duration field value of the setting frame; and
   a frame transceiver for transmitting the setting frame and then consecutively transmitting at least one data frame according to the determined duration field value.

7. The system of claim 6, wherein the protection mode operation decider decides that a communication environment is the OLBC environment when a protection bit is set in an ERP (extended rate PHY (physical layer)) field of a beacon frame received from the access point, and uses a self-CTS (clear to send) or RTS/CTS (request to send/clear to send).

8. The system of claim 6, wherein the transmission rate determiner determines the transmission rate of the current frame by checking the number of failed consecutive ACKs (acknowledgments), the number of succeeded ACKs (acknowledgments), a timer time, and a signal strength value in a state that the 802.11g protection mode is set.

9. A data transmission method in a Wireless Local Area Network (WLAN), comprising steps of:
   periodically transmitting beacon frame information; and
   determining the number of data frames to be transmitted depending on a transmission rate of a current data frame, producing a setting frame containing duration information determined depending on the number of data frames to be transmitted, transmitting the setting frame, and then consecutively transmitting as many data frames as the determined number during a duration time when it is determined that a communication environment is an OLBC (overlapping legacy BSS (basic service set) condition) environment based on the transmitted beacon frame information.

10. The method of claim 9, wherein the step of consecutively transmitting the data frame comprises the steps of:

deciding whether a communication environment is the OLBC environment comprising an 802.11b wireless terminal and an 802.11g wireless terminal to determine whether to operate in an 802.11g protection mode;

determining the transmission rate of the current frame when the 802.11g protection mode is set;

determining the number of data frames to be transmitted per one setting frame depending on the determined transmission rate, the number of data frames to be transmitted being equal to at least one;

determining a duration field value of the setting frame according to the determined number of data frames to be transmitted; and transmitting the setting frame and then consecutively transmitting as many data frames as the determined number according to the determined duration field value.

11. The method of claim 10, wherein in the step of deciding whether a communication environment is the OLBC environment comprising an 802.11b wireless terminal and an 802.11g wireless terminal to determine whether to operate in an 802.11g protection mode, it is determined that a communication environment is the OLBC environment when a protection bit is set in an ERP (extended rate PHY (physical layer)) field of a beacon frame received from the access point, and a self-CTS (clear to send) or RTS/CTS (request to send/clear to send) is used.

12. The method of claim 10, wherein the transmission rate of the current frame is determined by checking the number of failed consecutive ACKs (acknowledgments), the number of succeeded ACKs (acknowledgments), a timer time, and a signal strength value in a state that the 802.11g protection mode is set.

13. A data transmission method in a Wireless Local Area Network (WLAN), comprising steps of:

periodically transmitting beacon frame information; and producing a setting frame containing transmission time information depending on a transmission rate of a current data frame, transmitting the setting frame and then consecutively transmitting at least one data frame during the transmission when it is determined that a communication environment is an OLBC (overlapping legacy BSS (basic service set) condition) environment based on the transmitted beacon frame information.

14. The method of claim 13, wherein the step of consecutively transmitting the data frame comprises steps of:

deciding whether a communication environment is the OLBC environment comprising an 802.11b wireless terminal and an 802.11g wireless terminal to determine whether to operate in an 802.11g protection mode;

determining the transmission rate of the current frame when the 802.11g protection mode is set;

allocating a transmission time of a data frame depending on the determined transmission rate and determining the allocated time as a duration field value of the setting frame; and transmitting the setting frame and then consecutively transmitting at least one data frame according to the determined duration field value.

15. The method of claim 14, wherein in the step of deciding whether a communication environment is the OLBC environment comprising an 802.11b wireless terminal and an 802.11g wireless terminal to determine whether to operate in an 802.11g protection mode, it is determined that a communication environment is the OLBC environment when a protection bit is set in an ERP (extended rate PHY (physical layer)) field of a beacon frame received from the access point, and a self-CTS (clear to send) or RTS/CTS (request to send/clear to send) is used.

16. The method of claim 14, wherein the transmission rate of the current frame is determined by checking the number of failed consecutive ACKs (acknowledgments), the number of succeeded ACKs (acknowledgments), a timer time, and a signal strength value in a state that the 802.11g protection mode is set.

* * * * *